United States Patent
Tscharntke et al.

(10) Patent No.: US 11,402,739 B2
(45) Date of Patent: Aug. 2, 2022

(54) APPARATUS FOR DISPLAYING STILL AND MOVING IMAGES ON A THREE-DIMENSIONAL PROJECTION SCREEN

(71) Applicant: Rico Tscharntke, Berlin (DE)

(72) Inventors: Rico Tscharntke, Berlin (DE); Piet Koenekoop, Rosengarten (DE)

(73) Assignee: Rico Tscharntke, Berlin (DE)

( * ) Notice: Subject to any disclaimer, the term of this patent is extended or adjusted under 35 U.S.C. 154(b) by 0 days.

(21) Appl. No.: 17/255,691

(22) PCT Filed: Jun. 28, 2019

(86) PCT No.: PCT/DE2019/100605
§ 371 (c)(1),
(2) Date: Dec. 23, 2020

(87) PCT Pub. No.: WO2020/007412
PCT Pub. Date: Jan. 9, 2020

(65) Prior Publication Data
US 2021/0286251 A1    Sep. 16, 2021

(30) Foreign Application Priority Data
Jul. 2, 2018    (DE) ...................... 10 2018 005 292.4

(51) Int. Cl.
*G03B 21/585*    (2014.01)
*H04N 13/363*    (2018.01)
(Continued)

(52) U.S. Cl.
CPC .......... *G03B 21/585* (2013.01); *G03B 21/28* (2013.01); *G06T 3/005* (2013.01); *H04N 9/3141* (2013.01);
(Continued)

(58) Field of Classification Search
CPC ...... G03B 21/585; G03B 21/28; G03B 21/10; G06T 3/005; H04N 9/3141; H04N 9/3185; H04N 13/363
See application file for complete search history.

(56) References Cited

U.S. PATENT DOCUMENTS

| 4,103,369 A | | 8/1978 | Riordan |
| 4,597,633 A | * | 7/1986 | Fussell .................. G03B 21/56 352/69 |

(Continued)

FOREIGN PATENT DOCUMENTS

| CN | 101183208 A | 5/2008 |
| DE | 69918025 T2 | 7/2005 |
| WO | WO 2008065400 A2 | 6/2008 |

OTHER PUBLICATIONS

Lictraum Berlin, "AirGlobe 360 Grad Videosystem Hoffest," YouTube video, Oct. 16, 2018, available at https://www.youtube.com/watch?v=8ZND-INKRu4.

(Continued)

*Primary Examiner* — Michael E Teitelbaum
(74) *Attorney, Agent, or Firm* — Andrus Intellectual Property Law, LLP

(57) ABSTRACT

An apparatus for displaying still and moving images on a three-dimensional projection screen includes a gas-inflatable envelope made of flexible material with an inner surface serving as three-dimensional projection screen, a gas inlet opening, a fan connected to the gas inlet opening and which generates a gas flow that inflates the envelope, an interior surrounded by the envelope, a projector emitting a projector beam and a reflection mirror set up in the zenith of the envelope, said reflection mirror having a curved mirror surface for deflecting the projector beam onto the inner surface of the envelope. The image generated by the projector beam is visible on the outer surface of the envelope.

(Continued)

The projector is configured within the interior of the envelope and aligned in such a way that the projector beam is reflected onto the inner surface serving as a three-dimensional projection screen via the reflection mirror.

14 Claims, 1 Drawing Sheet

(51) Int. Cl.
*G03B 21/28* (2006.01)
*G06T 3/00* (2006.01)
*H04N 9/31* (2006.01)

(52) U.S. Cl.
CPC ......... *H04N 9/3185* (2013.01); *H04N 13/363* (2018.05)

(56) References Cited

U.S. PATENT DOCUMENTS

| | | | | |
|---|---|---|---|---|
| 6,327,020 | B1* | 12/2001 | Iwata | G03B 37/00 |
| | | | | 348/36 |
| 6,875,119 | B2* | 4/2005 | Murphy | E04H 15/22 |
| | | | | 472/134 |
| 2010/0282344 | A1* | 11/2010 | Carolan | G09F 15/0025 |
| | | | | 137/565.17 |
| 2013/0033650 | A1* | 2/2013 | Roberts | G03B 21/625 |
| | | | | 348/744 |
| 2016/0109791 | A1* | 4/2016 | Chan | G03B 21/62 |
| | | | | 353/79 |
| 2019/0014912 | A1* | 1/2019 | Nishida | A47C 19/02 |

OTHER PUBLICATIONS

Airglobe_Videosystem, "LNDW 18 mittendrin," Instagram post, Jun. 13, 2018, available at https://www.instagram.com/p/Bj9p47LHJW_/.
International Search Report in corresponding International Application No. PCT/DE2019/100605, dated Oct. 17, 2019.

* cited by examiner

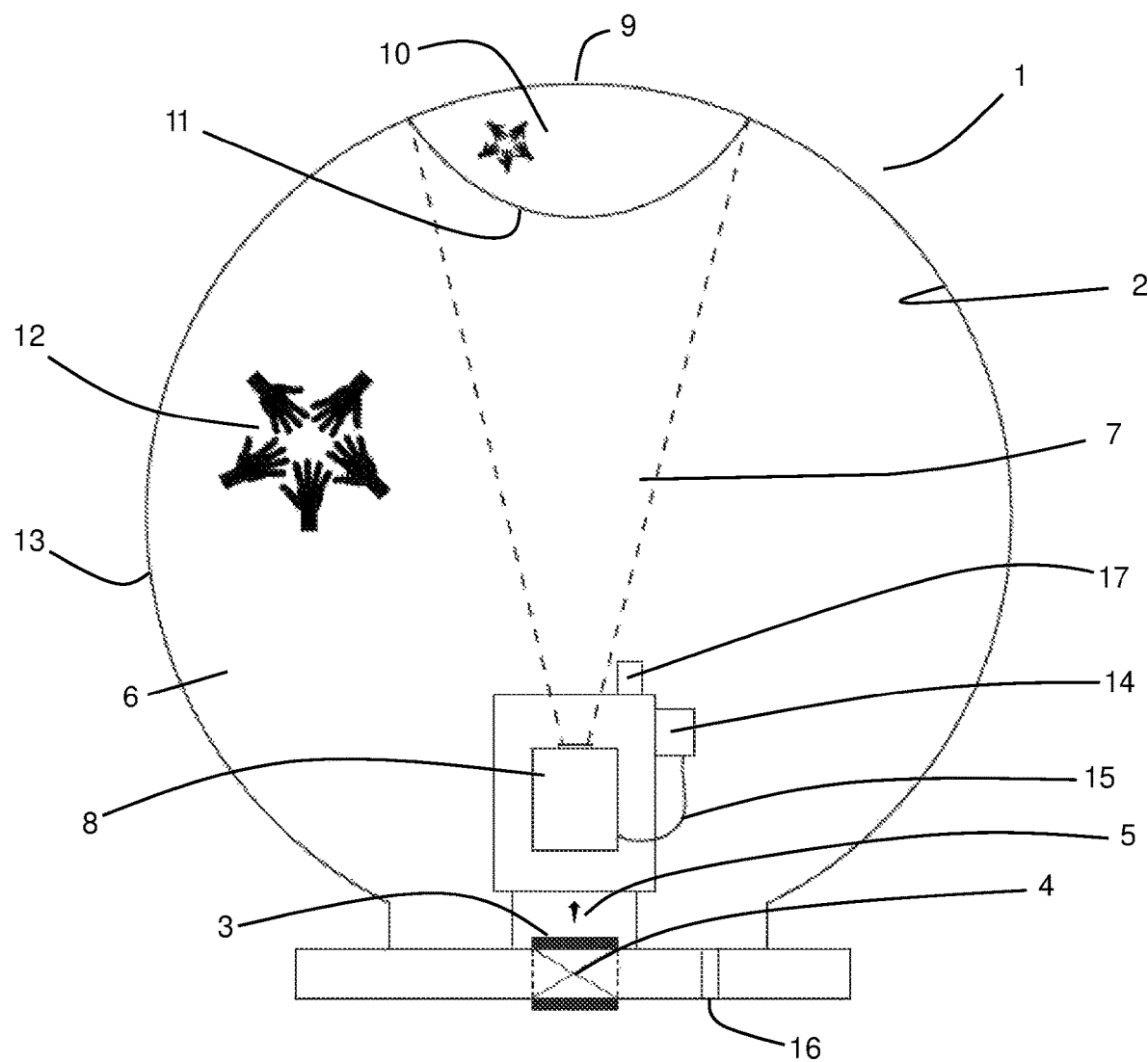

APPARATUS FOR DISPLAYING STILL AND MOVING IMAGES ON A THREE-DIMENSIONAL PROJECTION SCREEN

CROSS-REFERENCE TO RELATED APPLICATIONS

This application is the U.S. national stage application of International Application PCT/DE2019/100605, filed Jun. 28, 2019, which International Application was published on Jan. 9, 2020, as International Publication WO 2020/007412 in the German language. The International Application claims priority to German Application No. 10 2018 005 292.4, filed Jul. 2, 2018. The International Application and German Application are incorporated herein by reference, in their entireties.

FIELD

The invention relates to an apparatus for displaying still images or moving images such as video animation on a three-dimensional projection screen, in which the projection is projected onto the inner surface of an inflatable translucent envelope.

BACKGROUND

U.S. Pat. No. 4,103,369 describes a transportable inflatable envelope in which a substantially two-dimensional screen sheet, on which films or images can be displayed, is integrated in a delimited area.

A display system operating with a plurality of projectors, which makes use of an inflatable projection envelope, is known from U.S. Pat. No. 4,597,633.

WO 2008/065400 A2 discloses a display system which comprises an inflatable envelope, on the inner surface of which a projection image, which the observer can see from the outside on the outer surface of the envelope, is produced. The projector is arranged in an opening of the envelope. A disadvantage of the system described is that the projector is equipped with a highly complex wide-angle lens, which expands the emitted projection beam in such a way that it is imaged on the entire inner side of the three-dimensional envelope. For undistorted reproduction of the image on the inner envelope side, it is necessary to carry out complex rendering of the output data of the image to be imaged in 3D, that both the spatial formation of the inner envelope surface and the deviation properties of the lens need to be calculated in so as to avoid imaging errors.

SUMMARY

In order to overcome the aforementioned disadvantages, an apparatus for displaying still or moving images on a three-dimensional projection screen is provided, which comprises a gas-inflatable envelope which is made of a flexible material and has an inner surface used as a three-dimensional projection screen and an interior enclosed by the envelope. The display apparatus is equipped with a gas inlet opening through which a gas, preferably air, is blown into the envelope in order to unfold and inflate the envelope and to maintain the envelope internal pressure in the inflated state. The gas inlet opening may be arranged directly in the envelope, or alternatively in an envelope support frame or base connected to the envelope. The gas flow required for inflating the envelope and maintaining the envelope internal pressure can be produced by a blower. The blower is connected to the gas inlet opening. Either the outlet of the blower is arranged directly in the gas inlet opening or it is connected to the gas inlet opening by means of a delivering tube.

A projector which emits a projection beam into the interior of the envelope is arranged in order to produce the three-dimensional projection on the inner surface of the envelope. In order to deflect the projection beam emitted by the projector onto the inner surface of the envelope, a reflection mirror having a curved, for example spherically, in particular hemispherically shaped mirror surface is arranged at the zenith of the envelope, in which case the image produced by the projection beam may be still or moving and visible on the outer surface of the envelope and observable by an observer located outside the display apparatus.

The display apparatus is distinguished in that the projector is arranged inside the interior of the envelope and is aligned there in such a way that the projection beam emitted by the projector is radiated in the direction of the reflection mirror arranged at the zenith, is fully reflected by the reflection mirror and is reflected onto the inner surface, used as a three-dimensional projection screen, of the envelope, so that the inner surface is covered almost fully, and in particular fully, with the image information to be represented.

When the envelope has been inflated, the reflection mirror is arranged at the zenith of the envelope.

The essential design of the display apparatus according to the invention is based on a projection envelope supported by gas pressure or air pressure, to which a three-dimensional shape is imparted by blowing in air or gas. By virtue of the structure of the display apparatus according to the invention, it is possible for the still image or moving image produced by the projection beam to extend almost over the entire inner surface of the envelope and fill it.

The gas pressure required inside the projection envelope is produced by a blower or another air pressure source. Typically, the aeration (gas filling) of the display apparatus is carried out through a gas filling opening aligned with the bottom, so that the gas flow is directed upward, preferably vertically upward, when entering the interior of the envelope. The gas flow is advantageously maintained during the projection of the images or videos carried out onto the inner surface of the envelope.

As an alternative, a closure apparatus, which makes it possible to adjust the delivery of the gas flow and to operate the display apparatus for a certain time without a continuous gas flow, may be integrated in the gas inlet opening.

The envelope preferably consists of a substantially air-impermeable fabric such as balloon silk or ripstop nylon. Alternative materials are synthetic materials such as materials made of plastic.

The information transmission of the image data is in this case carried out by projection so that a preferably spherical display screen is covered almost fully with image information. The projection is carried out from the interior of the envelope, in contrast to known systems.

In one particular exemplary embodiment, the projector is arranged in the interior of a spherical envelope, at a position which is located at a point on the midaxis of the envelope, and is aligned there in the direction of the reflection mirror, which is likewise located in extension of the midaxis and in this exemplary embodiment has a hemispherical shape. The projection beam radiated by the projector is emitted along the midaxis in order to strike the hemispherical reflection mirror at the zenith of the spherical envelope. From there, the image or video to be projected is reflected onto the inner surface of the spherical envelope, the image or video being fully imaged onto the sphere inner surface surrounding the reflection mirror.

In a further embodiment, the projector arranged in the interior of the envelope is positioned in the gas flow produced by the blower. An advantage of arranging the projector in the gas flow is that, in addition to maintaining the internal pressure by the continuous gas flow of the blower during the projection, the projector is cooled and the operating time is thereby extended.

A video projector of the LCD, DLP or LcoS design may be used, although a laser system with moving mirrors or even a slide projector with a static image may also be employed.

A microcomputer, which carries out the image generation and is connected to a video projector by a data connection, for example HDMI, may additionally be arranged inside the envelope. In this way, an image converted into an azimuthal projection shape may be produced. In addition, the use of a microcomputer makes it possible to play back data autonomously as video and audio. A microcomputer may be controlled by means of conventional interfaces such as WLAN or Ethernet cable. Data streams from a network may furthermore be represented.

The display apparatus may be equipped with sensors, such as infrared sensors or lidar sensors, for environmental observation. By means of these sensors, information relating to the presence and the movement of persons located in the environment of the display apparatus is registered, and these data are used for spontaneous configuration of the projection on the inner surface of the envelope. To that end, this information is evaluated by means of an evaluation unit in order to incorporate the generated image data into the projection or to produce a new projection. In this way, it is possible for an observer to interact with the projection and/or the projection surface, for example in order to call up or modify image contents.

In a further alternative embodiment, a light registering apparatus, for example a camera, which has the property of identifying and registering visible light with a defined property and with which visible light impinging on the outer surface of the envelope with a defined property is recorded as a light event and this property is digitally processed so that a temporally limited change of the image or video projected on the inner surface of the envelope takes place, is arranged inside the interior of the envelope.

The light registering apparatus scans the inner surface of the envelope, preferably the entire inner surface, for light events in order to detect light events occurring on the outer surface of the envelope. The scan of the envelope inner surface and/or the event registration may also be carried out indirectly by means of the a focusing of the light registering apparatus onto the imaging, reproduced in the reflection mirror, of the inner envelope surface.

Light events are, for example, light spots which are projected by a flashlight, a laser pointer or another focusing light source onto the outer surface of the envelope. Both locally stationary light events (in other words unmoved light events) and moving light events may be detected and evaluated. The light events detected are converted in a computer unit, for example the microcomputer arranged in the display apparatus, into digital data which lead to a change of the program sequence of the current projection. For example, a program in which light spots distributed over the inner surface of the envelope are projected may be reprogrammed in such a way that the light spots are grouped around the light event, so that the visual impression is created for the user that his or her light event produced on the outer surface of the envelope by a light source is attracting the light spots. As soon as the light event is ended, the projection returns to the previous program sequence or a new program sequence for reproducing another projection is started. The detection and evaluation of light events applied externally onto the outer face of the envelope by means of a light detecting unit allow a further form of the interaction of the observer with the projection surface.

In a further alternative embodiment, the display apparatus may be integrated into a hot-air balloon. In this case, the curved mirror is mounted suspended from the balloon envelope at the zenith and is held in position by the gas pressure of the heated air in the balloon. The projector or projectors are mounted underneath in the gondola in such a way that they irradiate the mirror. The electricity required is provided by a generator in the gondola, or another storage system.

The reflection mirror is arranged floating when the envelope has been inflated. By flexible positioning means such as ropes, chains or belts, the reflection mirror may be held in a substantially fixed floating position.

In order to prevent tearing or bursting of the envelope during ongoing operation of the blower, the display apparatus may be equipped with at least one means for regulating the inflation pressure, or the envelope internal pressure. Such a means may be a regulating valve or a flap in the base or in the envelope of the display apparatus, and as an alternative or in addition pressure regulation may be carried out by means of a perforation or slit in the envelope material.

BRIEF DESCRIPTION OF THE DRAWINGS

The invention will be explained in more detail below with the aid of an exemplary embodiment.

FIG. 1 shows a preferred configuration of the display apparatus according to the invention.

DETAILED DESCRIPTION

The represented apparatus for displaying still and moving images on a three-dimensional projection screen comprises a gas-inflatable spherical envelope 1 made of a flexible material, the inner surface 2 of which forms a three-dimensional projection screen on which an image 12 can be imaged. The display apparatus is equipped with a gas inlet opening 3, through which air is blown into the envelope 1 in order to unfold the envelope 1 and obtain the envelope internal pressure required for the inflated state. The gas inlet opening 3 is arranged in a base connected to the envelope 1. The blower 4 is arranged in the gas inlet opening 3.

In order to produce an image 12 which can be imaged on the inner surface 2, a projector 8 which emits a projection beam 7 into the interior 6 of the envelope 1 is arranged inside the envelope 1. For complete deflection of the projection beam 7 emitted by the projector 8 onto the inner surface 2 of the envelope 1, a reflection mirror 10 having a hemispherically shaped mirror surface 11 is arranged at the zenith 9 of the envelope 1. The image 12 is visible to the observer on the outer surface of the envelope.

The projector 8 is arranged in the interior 6 of the spherical envelope 1 on the midaxis of the envelope and in the direction there of the reflection mirror 10 likewise located in extension of the midaxis. The projection beam 7 radiated by the projector 8 is emitted along the midaxis in order to strike the hemispherical reflection mirror 10 at the zenith 9 of the envelope 1. From there, the image to be projected is reflected onto the inner surface 2 of the spherical envelope 1.

The projector 8 is positioned in the gas flow 5 produced by the blower 4, so that the projector 8 is cooled and the operating time of the display apparatus is thereby extended.

A microcomputer 14, which carries out the image generation and is connected to the projector 8 by means of a data transmission cable 15, is arranged inside the envelope 1.

In addition, a light registering apparatus 17 in the form of a camera, with which light events impinging on the outer surface 13 of the envelope 1 can be recorded and these can be digitally processed, as a consequence of which a temporally limited change of the image 12 projected on the inner surface 2 of the envelope 1 can be produced, is arranged in the interior 6 of the envelope 1.

In order to prevent tearing or bursting of the envelope during ongoing operation of the blower, a means for regulating the inflation pressure, or the envelope internal pressure, is arranged in the base of the display apparatus.

LIST OF REFERENCES 1 envelope
2 inner surface
3 gas inlet opening
4 blower
5 gas flow
6 interior
7 projection beam
8 projector
9 zenith
10 reflection mirror
11 mirror surface
12 projected image/projected video
13 outer surface
14 microcomputer
15 data transmission cable
16 means for regulating the envelope internal pressure
17 light registering unit

The invention claimed is:

1. An apparatus for displaying still and moving images on a three-dimensional projection screen, comprising:
   a gas-inflatable envelope which is made of a flexible material and has an inner surface used as a three-dimensional projection screen;
   a gas inlet opening;
   a blower, which is connected to the gas inlet opening and produces a gas flow which inflates the envelope;
   an interior enclosed by the envelope;
   a projector emitting a projection beam; and
   a reflection mirror which is arranged at the zenith of the envelope and has a curved mirror surface for deflecting the projection beam emitted by the projector onto the inner surface of the envelope, the still image or moving image produced by the projection beam being visible on the outer surface of the envelope and observable from the outside;
   wherein the projector is arranged inside the interior of the envelope and is aligned in such a way that the projection beam emitted by the projector is radiated directly from the projector onto the reflection mirror arranged at the zenith and fully reflected by the reflection mirror onto the inner surface used as the three-dimensional projection screen.

2. The apparatus as claimed in claim 1, wherein the reflection mirror is suspended from the envelope so that the reflection mirror is floating when the envelope has been inflated.

3. The apparatus as claimed in claim 2, wherein the reflection mirror is held in a substantially fixed floating position by flexible positioning means.

4. The apparatus as claimed in claim 1, wherein a microcomputer, which is connected to the projector by means of a data transmission cable, is configured to produce an azimuthal projection shape.

5. The apparatus as claimed in claim 1, wherein the projector arranged in the interior of the envelope is positioned in the gas flow produced by the blower.

6. The apparatus as claimed in claim 1, wherein the apparatus is equipped with at least one means for regulating the inflation pressure.

7. The apparatus as claimed in claim 1, wherein envelope is made from a substantially air-impermeable fabric or synthetic material.

8. The apparatus as claimed in claim 1, wherein the still image or moving image produced by the projection beam extends over the entire inner surface of the envelope.

9. The apparatus as claimed in claim 1, wherein the envelope is the balloon envelope of a hot-air balloon.

10. The apparatus as claimed in claim 1, wherein a light registering apparatus, with which visible light impinging on the outer surface of the envelope with a defined property is recorded as a light event, and this light event is digitally processed so that a temporally limited change of an image or video projected on the inner surface of the envelope takes place, is arranged inside the interior of the envelope.

11. The apparatus as claimed in claim 10, wherein the light registering apparatus is a camera.

12. The apparatus as claimed in claim 10, wherein the light registering apparatus scans the inner surface of the envelope to detect light events occurring on the outer surface of the envelope.

13. The apparatus as claimed in claim 10, wherein the image or video projected on the inner surface of the envelope returns to the image or video projected on the inner surface prior to the temporally limited change once the light event has ended.

14. An apparatus for displaying still and moving images on a three-dimensional projection screen, comprising:
   a gas-inflatable envelope which is made of a flexible material and has an inner surface used as a three-dimensional projection screen;
   a gas inlet opening;
   a blower, which is connected to the gas inlet opening and produces a gas flow which inflates the envelope;
   an interior enclosed by the envelope;
   a projector emitting a projection beam; and
   a reflection mirror which is arranged at the zenith of the envelope and has a curved mirror surface for deflecting the projection beam emitted by the projector onto the inner surface of the envelope, the still image or moving image produced by the projection beam being visible on the outer surface of the envelope and observable from the outside;
   wherein the projector is arranged inside the interior of the envelope and is aligned in such a way that the projection beam emitted by the projector is reflected by means of the reflection mirror arranged at the zenith onto the inner surface used as the three-dimensional projection screen; and wherein a light registering apparatus, with which visible light impinging on the outer surface of the envelope with a defined property is recorded as a light event, and this light event is digitally processed so that a temporally limited change of an image or video projected on the inner surface of the envelope takes place, is arranged inside the interior of the envelope.

\* \* \* \* \*